(12) United States Patent
Peless et al.

(10) Patent No.: US 6,493,613 B2
(45) Date of Patent: *Dec. 10, 2002

(54) METHOD FOR OPERATING A ROBOT

(75) Inventors: Ehud Peless, Even-Yehuda (IL); Shai Abrahamson, Pardesia (IL); Ilan Peleg, Tzur-Yigaal (IL)

(73) Assignee: Friendly Robotics Ltd., Kadima (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/920,933

(22) Filed: Aug. 2, 2001

(65) Prior Publication Data

US 2001/0047231 A1 Nov. 29, 2001

Related U.S. Application Data

(63) Continuation of application No. 09/221,834, filed on Dec. 29, 1998, now Pat. No. 6,339,735.

(51) Int. Cl.[7] .................................................. G06F 7/00
(52) U.S. Cl. ...................................... 701/23; 56/10.2 A
(58) Field of Search ........................... 701/23, 25, 200, 701/202, 300, 301; 56/10.2 A, 10.2 R; 180/168, 169; 318/587

(56) References Cited

U.S. PATENT DOCUMENTS

| | | | |
|---|---|---|---|
| 3,425,197 A | 2/1969 | Kita | 56/10.2 F |
| 3,550,714 A | 12/1970 | Bellinger | 56/10.2 A |
| 3,570,227 A | 3/1971 | Bellinger | 56/10.2 A |
| 3,650,097 A | 3/1972 | Nokes | 56/10.2 A |
| 3,789,939 A | 2/1974 | Geislinger | 180/6.5 |
| 3,924,389 A | 12/1975 | Kita | 56/10.2 A |
| 4,184,559 A | 1/1980 | Rass | 180/401 |
| 4,500,970 A | 2/1985 | Daemmer | 180/168 |
| 4,545,453 A | 10/1985 | Yoshimura et al. | 180/401 |
| 4,573,547 A | 3/1986 | Yoshimura et al. | 180/168 |
| 4,694,639 A | 9/1987 | Chen et al. | 56/10.2 A |
| 4,777,785 A | 10/1988 | Rafaels | 56/10.2 A |
| 4,809,178 A | 2/1989 | Ninomiya et al. | 701/200 |
| 4,831,813 A | 5/1989 | Jonas et al. | 56/10.2 A |
| 4,919,224 A | 4/1990 | Shyu et al. | 180/168 |
| 5,007,234 A | 4/1991 | Shurman et al. | 56/10.2 R |
| 5,079,706 A | 1/1992 | Yamaguchi et al. | 701/23 |
| 5,204,814 A | 4/1993 | Noonan et al. | 701/25 |
| 5,353,224 A | 10/1994 | Lee et al. | 701/25 |
| 5,402,051 A | 3/1995 | Fujiwara et al. | 318/587 |
| 5,841,259 A | 11/1998 | Kim et al. | 318/587 |
| 6,339,735 B1 * | 1/2002 | Peless et al. | 701/23 |

FOREIGN PATENT DOCUMENTS

| | | |
|---|---|---|
| EP | 0 786 229 A | 7/1997 |
| FR | 2 696 569 A | 4/1994 |
| WO | WO 96/38770 | 12/1996 |

* cited by examiner

*Primary Examiner*—William A. Cuchlinski, Jr.
*Assistant Examiner*—Edward Pipala
(74) *Attorney, Agent, or Firm*—Polsinelli Shalton & Welte, P.C.

(57) ABSTRACT

There is disclosed a utility robot for operating in multiple modes, in particular, at least one autonomous mode and at least one manual mode. The robot is configured with a recognition system for recognizing a signal indicating the particular mode in which to operate, and adjusts its control system accordingly. Methods for operation of this utility, performing various tasks, such as lawn mowing, vacuuming, floor cleaning and snow removing are also disclosed.

5 Claims, 5 Drawing Sheets

METHOD FOR OPERATING A ROBOT

This application is a continuation of U.S. patent application Ser. No. 09/221,834, filed Dec. 29, 1998, now U.S. Pat. No. 6,339,735. U.S. patent application Ser. No. 09/221,834 is incorporated by reference in its entirety herein.

FIELD OF THE INVENTION

The present invention relates to a utility robot and to method for operating a utility robot. More specifically, the present invention relates to an autonomous utility robot comprising multiple action modes and to a method for its operation.

BACKGROUND OF THE INVENTION

As society becomes more advanced, it looks to ways in which time can be better utilized. Accordingly, there is a desire to replace humans with robots to perform common tasks, freeing people to do other things, and thus, better utilize their time. U.S. Pat. Nos. 5,353,224 and 5,402,051 disclose robots that function as cleaners.

Robots that have been used as self propelled lawn mowers, operating on the principle of random motion within a boundary, are described in U.S. Pat. Nos. 3,550,714, 4,809,178 and 3,570,227. Autonomous self propelled lawn mowers operating along pre planned routes are described in U.S. Pat. Nos. 3,650,097, 4,500,970, 4,694,639 and 3,789,939. Lawn mowers autonomously operating along defined edges or boundaries are described in U.S. Pat. Nos. 3,924,389, 3,425,197, 4,184,559, 4,545,453, 4,573,547, 4,777,785, 4,831,813, 5,007,234 and 5,204,814. Finally, WO 96/38770 describes a robot covering an area within boundaries, continuously correcting its position by comparing calculated and actual coordinates of the boundaries.

These autonomous robots exhibit drawbacks in that they operate in an autonomous mode only. They are designed to cover relatively large areas and can not be applied to small areas such as edges or small patches of grass. Furthermore, there are limitations on the navigation systems of the described robots which cause them to miss certain areas within the work area, such as those very close to the boundaries of the work area or to boundaries of obstacles within the work area. These aforementioned autonomous robots, therefore, are limited in their ability to entirely cover a required area and are not suited for use in relatively small areas, sometimes required in households.

SUMMARY OF THE INVENTION

It is an object of the present invention to provide a utility robot for performing a task, in at least one area, which overcomes the limitations of the existing utility robots in that it comprises an autonomous task performing mode or modes and a manual task performing mode or modes. It is further an object of the present invention to provide a method for operating a utility robot which includes combining an autonomous task performing mode or modes of operation with a manual mode or modes of operation. This combination, as available in a single robot, allows for operating in areas that are not accessible to a utility robot that operates only in the autonomous mode.

In a preferred embodiment the utility robot is a lawn mower capable of operating in at least one autonomous mode and at least one manual mode. The lawn mower comprises a main body configured for receiving a signal from a control device, a recognition system for recognizing the signal and a controller, in communication with the recognition system, for changing the operative mode, in accordance with the recognized signal.

The method for operating a utility robot, according to the present invention comprises sending a first signal, to a recognition system in the utility robot, for performing at least one task in said at least one area in a first mode and sending a second signal, to the recognition system, for performing said task in a second mode in said at least one area.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

The present invention relates to a utility robot and a method for its operation. The utility robot according to the invention may perform tasks such as surface maintenance tasks, e.g. vacuum cleaning, wet floor cleaning, snow shoveling and lawn mowing. In one embodiment of the invention, the utility robot is a lawn mower.

Figure 1A:
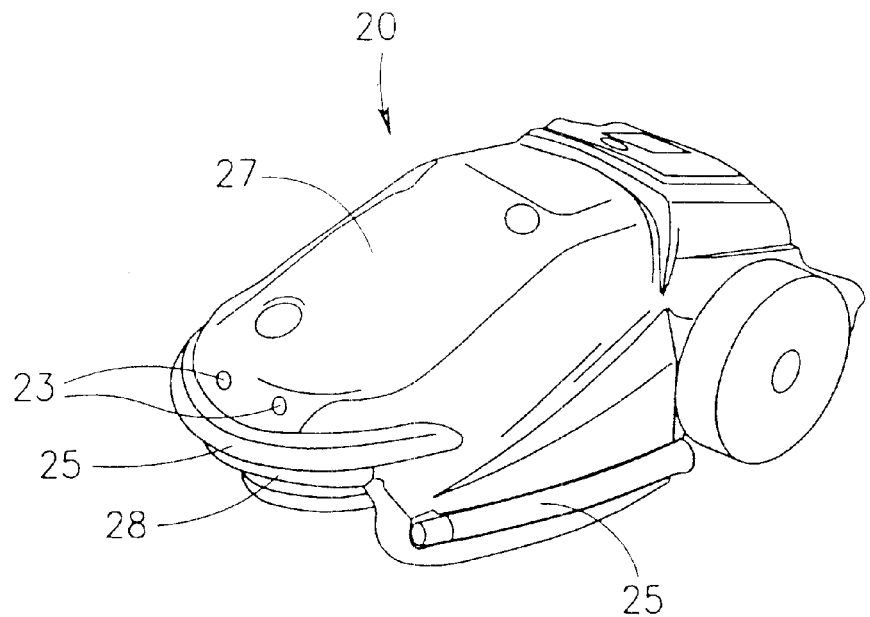
FIGS. 1A and 1B are front and rear view perspective views of the utility robot according to an embodiment of the present invention.
Figure 1B:
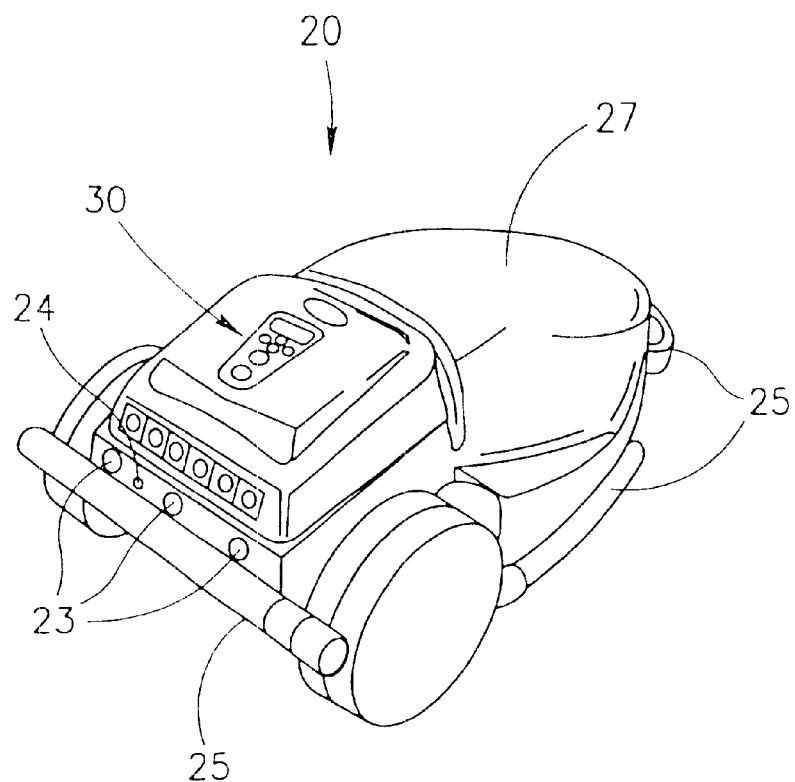

In FIGS. 1A and 1B, there is shown the utility robot of the present invention as lawn mower 20, that comprises autonomous and manual task performing modes. The lawn mower 20 includes a main body 27 that houses a control system for controlling the mode of the mower operation as described in FIG. 3, in electric communication with a recognition system (detailed in FIG. 3). The rear section of the main body 27 includes a port (41 FIG. 3) for receiving signals through an accessories socket from an operator controlled device or other accessory devices such an immobilizer or charger, and a sensor unit for receiving remote signals from an operator controlled remote device. Both the port and the sensor unit are electronically linked to the recognition system 42.

There is also a control panel 30 for setting the autonomous modes of the lawn mower. In the manual mode the lawn mower 20 is controlled by control unit 30'(detailed in FIG. 2B) and may be further manually manipulated, such as being pushed or pulled, by using front handle 28.

The port includes accessories socket 24 that is used for receiving signals from accessory devices such as a charger for charging the lawn mower or an immobilizer for plugging in each time the lawn mower is turned on, thereby protecting the lawn mower against unauthorized use, such as by children or by thieves.

The lawn mower 20 further comprises front and rear proximity sensors 23 and tactile impact sensors 25, which assists the operation of the lawn mower in the autonomous mode, as will be described bellow.

The main body 27 also houses a cutting blade and mulching deck for mowing a lawn. For example, the main body may house a cutting blade such as described in U.S. patent application Ser. No. 60/077,678, filed on Mar. 12, 1998, assigned to the common assignees of the present invention, or any of the cutting blades commonly used for lawn mowing.

In an alternative embodiment, gathering devices, such as a snow shovel, rake, or other cleaning devices, such as a broom, sweeper or wet floor cleaner, are housed or attached to the main body 27. Thus the utility robot can function for snow removal or other similar cleaning or clearing. In the snow shovel, a gathering device or other cleaning devices, could be mounted on a movable lift or the like, controlled by the controller, in accordance with the control electronics for the lawn mower (detailed above). In still an alternative embodiment, the main body of the robot includes a vacuum cleaner which is controlled by the controller in a manner similar to that for the lawn mower.

Figure 2A:
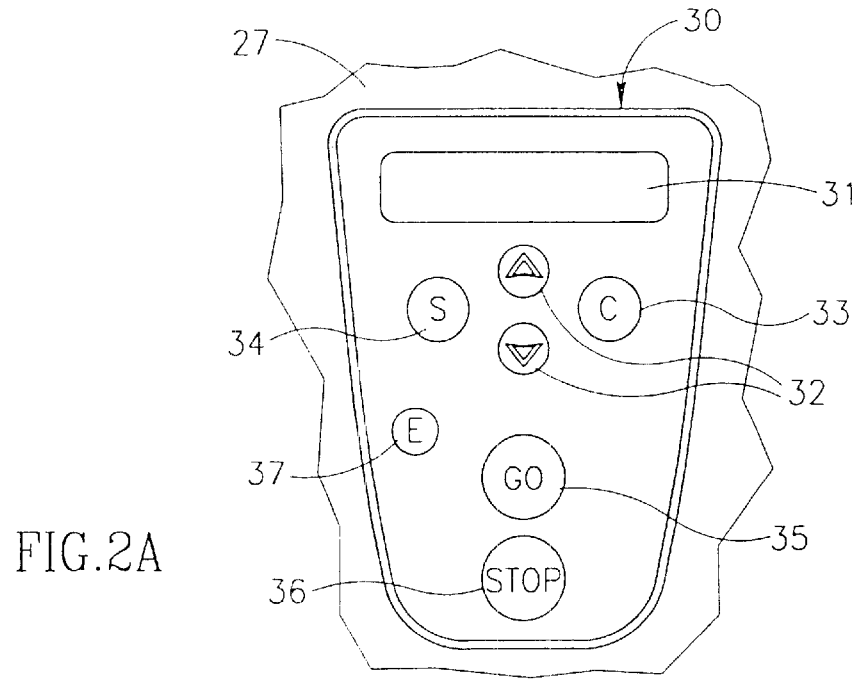
FIG. 2A is a front view of a control unit for operating the utility robot in an autonomous mode or in an edge cutting mode, according to an embodiment of the invention.

Reference is now made to FIG. 2A which illustrates a control unit for operating the lawn mower in an autonomous mode or in an edge cutting mode. The control unit is accessible to an operator through the control panel, generally referenced 30, The control panel comprises GO 35 and STOP 36 buttons for starting the lawn mower operation in an autonomous mode and for stopping its operation. Control panel 30 also comprises a display window 31 and means for programming certain functions, which are connected to the autonomous operation mode, which may be accessed through a programmable menu. These means are SELECT button 34, UP/DOWN arrow buttons 32 and CANCEL button 33.

In its autonomous mode of operation the robot may operate in any of the known methods for operating autonomous robots, which will be discussed in detail with reference to FIG. 4

Control panel 30 also comprises EDGE button 37 which is for operating the lawn mower in the edge cutting mode. The operation of the lawn mower in its edge cutting mode will be discussed in detail with reference to FIG. 5. The edge cutting function may be started by pressing EDGE button 37 or by programming a function which enables the edge cutting mode to automatically start after the autonomous lawn mowing of the device is finished, and which is operated by pressing GO button 35.

Figure 2B:
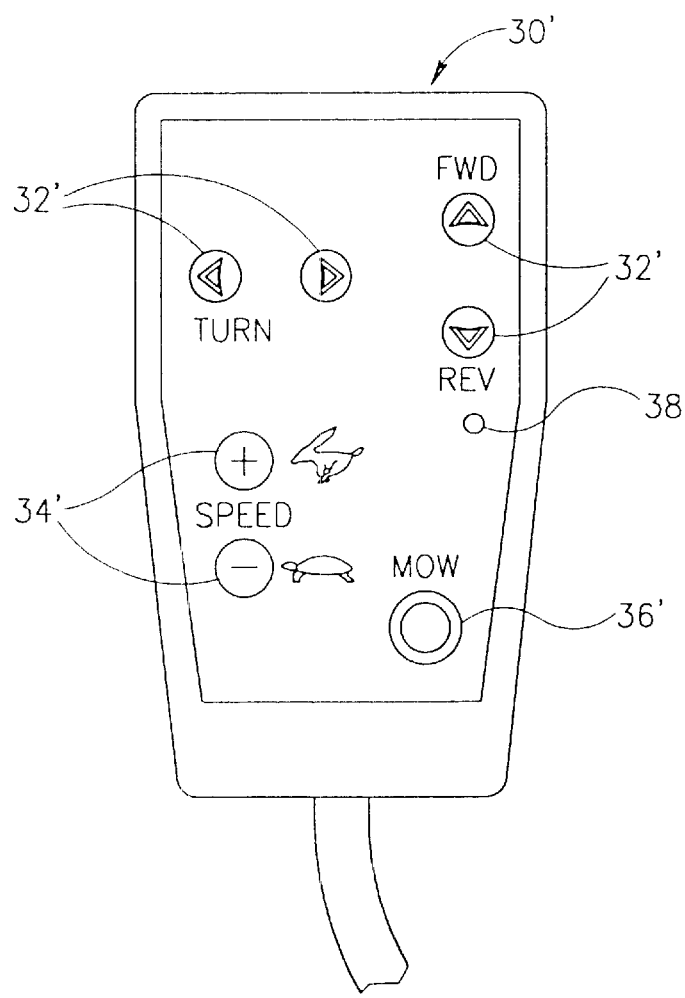
FIG. 2B is a front view of an alternative control unit for operating the utility robot, according to an embodiment of the invention.

Reference is now made to FIG. 2B which illustrates a control unit for operating the lawn mower in a manual mode. The manual control unit generally referenced 30', is for driving the lawn mower from one area to another and may be used to enable the lawn mower access to areas which are inaccessible to it while operating in the autonomous mode. In its autonomous mode, the lawn mower performs according to programmed parameters which are used to define inaccessible areas to the mower, such as the distance between the mower and an edge boundary (as will be discussed below). Thus, the manual mode is preferably used for driving the lawn mower from its storage area to the work area or for driving it in between two work areas which, to the lawn mower in its autonomous mode, seem physically distinct. Such areas may be two areas separately marked with edge boundaries, as will be described below, or a work area which is accessible only by a path of a width, which, to the lawn mower in its autonomous mode, is defined as inaccessible.

The manual control unit 30' comprises steering means such as left/right and forward/backward movement buttons 32' and speed control buttons 34'. Mow button 36' enables the lawn mower to mow while being manually driven. Mow button 36' is used for mowing relatively small work areas or edges of work areas or of obstacles in the work area (such as flower beds and trees). Light indication 38 is compliant with OPC (operator presence control) rules, known in the art.

The manually operated unit 30' may be any suitable control unit, either connected to the utility robot or a remote control unit, such as a unit utilizing radiant energy.

Figure 3:
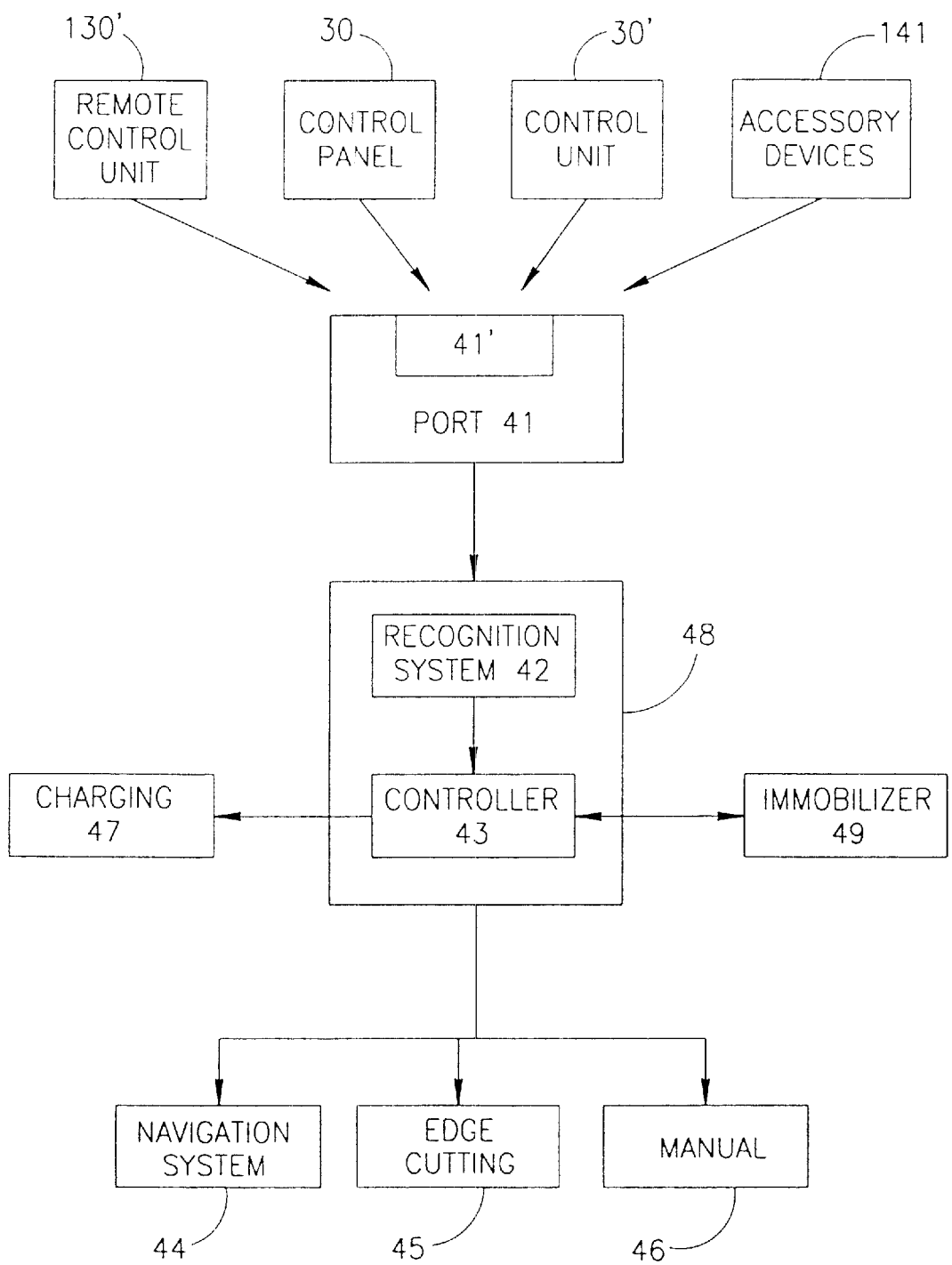
FIG. 3 is a block diagram illustration of the operation of the utility robot according to an embodiment of the present invention.

Reference is now made to FIG. 3 which illustrates, in block diagram form, the operation of the utility robot, such as lawn mower 20. Lawn mower 20 includes a port 41 for receiving a signal from units and devices, such as those described in FIG. 1, through which data is provided to recognition system 42, as to the specific mode required. Port 41 may include a sensor unit 41' for receiving remote signals from an operator, and a socket 24, as described in reference to FIG. 1. Recognition system 42 is capable of identifying the unit or device which was introduced to port 41 and instructs controller 43 accordingly. Controller 43 accordingly enables, actively or by default, any of the modes; autonomous (represented by the navigation system 44), edge cutting 45 or manual 46. Controller 43 can enable other operations, such as immobilizer 49, which protects the lawn mower against unauthorized use, or charging 47. It will be appreciated that the role of the recognition system 42 and of the controller 43 can be performed by one functional unit, such as microprocessor 48.

Thus, different signals are sent, through port 41, to recognition system 42, which are transmitted to controller 43, for differentially operating lawn mower 20. For example, pressing GO button 35 on control panel 30, operates navigation system 44, for operation in the autonomous mode. Changing lawn mower 20 operation from the autonomous mode can be achieved in the following ways: 1) by pressing STOP button 36 on control panel 30, 2) by pressing EDGE button 37 on control panel 30, 3) by plugging control unit 30' into port 41 or 4) by remotely signaling sensor unit 41' in port 41, by remote control unit 130'.

1) Pressing STOP button 36 will terminate lawn mower 20 operation.

2) Pressing EDGE button 37 will terminate operation in the autonomous mode and initiate operation in the edge cutting mode 45.

3) plugging control unit 30' into port 41 will terminate operation in the autonomous mode and initiate operation in the manual mode 46.

4) Remotely signaling sensor unit 41' through remote control unit 131' will terminate operation in the autonomous mode and initiate operation in the manual mode 46.

Once in the manual mode 46, lawn mower 20 is controlled by control unit 30' or by remote control unit 131'.

Accessory devices 141, such as a charger or immobilizer, which are introduced to port 41 provide recognition system 42 and controller 43 with a signal for charging 47 lawn mower 20 or for enabling operation of lawn mower 20, through immobilizer 49.

Figure 4:
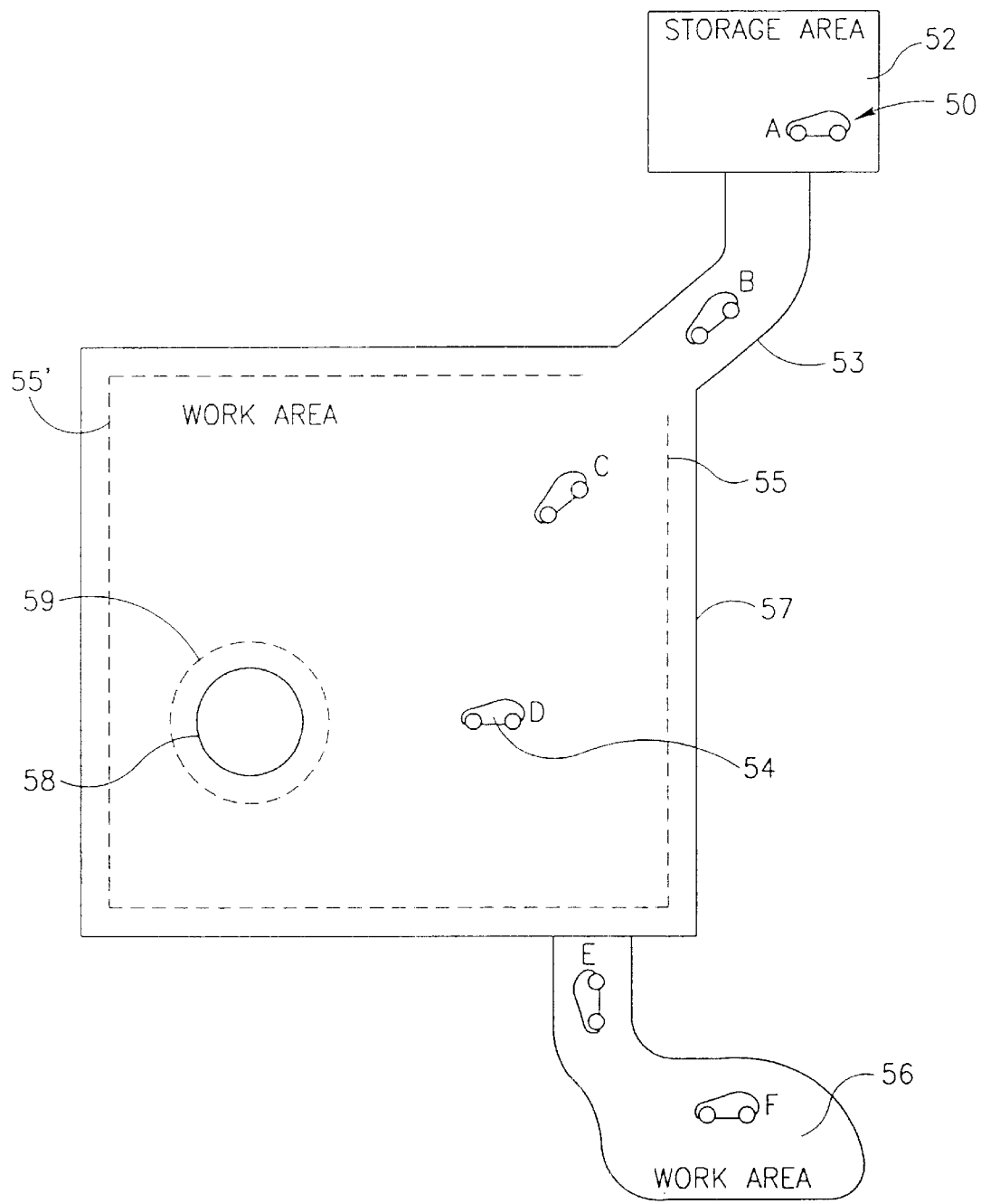
FIG. 4 is a schematic illustration of the utility robot of the invention operating as a lawn mower in accordance with an embodiment of the invention.

Reference is now made to FIG. 4 which is a schematic illustration of a task being performed by the utility robot in a manual mode and in an autonomous mode. The performance of the utility robot will be described by following a course taken by a lawn mower, according to an embodiment of the invention. The progress of the lawn mower through this course will be described with reference to the control unit 30' described in FIG. 2B.

In FIG. 4 the utility robot, generally referenced 50, is a lawn mower and work areas 54 and 56 are lawns. Lawn mower 50 is idle at point A in storage area 52. It is set into motion, preferably by plugging control unit 30', into accessories socket 24 (see FIG. 1) in the lawn mower, and is driven through point B, along path 53 using buttons 32 for following the contours of path 53 and using buttons 34 for achieving the appropriate speed of motion, according to considerations such as path surface smoothness etc.

Work area 54 is provided with boundary 55 along its perimeter 57. Boundary 55 is detectable by a proximity sensor (23 in FIG. 1) and may be, for example, a conducting wire having a current flowing through it, thus generating a magnetic field along the wire. Island 58 may be an obstacle such as a tree or flower bed in which it is not desired that the lawn mower 50 operate. Island 58 is provided with a boundary 59 along its perimeter. Boundary 59 is also detectable by a proximity sensor. A proximity sensor 23, such as a magnetic field sensor or an ultrasonic proximity sensor is positioned on the lawn mower 50 and processing means are connected to the sensor and receive an input therefrom.

Once the lawn mower arrives at work area 54 it is positioned at an initial location, and the autonomous mode is initiated either by pressing GO button 35 or by unplugging the manual control unit 30' from the machine and pressing GO button 35 (see FIG. 2A).

In its autonomous mode of operation the robot may operate in any of the known methods for operating autonomous robots. As an example, two methods, utilizing different navigation systems, will be described.

In one method the initial location for the lawn mower is point C. The lawn mower operates by systematically scanning within work area 54, moving in a straight line from one boundary (55) to the next (55'). To do so it is initially placed relatively close to one extreme edge of the boundary (such as point C), and faced in the desired direction for scanning. When operated the lawn mower 50 will be navigated in a generally straight line from point C in the direction of boundary 55': When the lawn mower encounters boundary 55' (either by sensing its proximity or by contacting it) the lawn mower is turned around in about 180°. The navigation system may utilize an odometer and compass and a sensing system for separately sensing boundaries and obstacles. Accordingly, there can be two different types of markers, boundary markers and obstacle markers. Alternatively, for obstacles which stick above the ground, such as trees and furniture, the obstacle sensors can be proximity and/or contact sensors (23 and 25 in FIG. 1).

In general, lawn mower 50 moves in generally straight, parallel lines between two boundary (55 and 55') markers. However, if the sensor system indicates that the lawn mower 50 is close to an obstacle boundary 59 marker, the navigation system causes the scan to occur between boundary 55 markers and obstacle 59 markers, counting the number of laps until the obstacle is passed. The next lap, brings the lawn mower 50 to boundary 55' marker on the other side of the obstacle, island 58. The lawn mower 50 then performs a scan in the opposite direction, between the boundary 55' markers and the obstacle boundary 59 markers, to cover the area behind island 58. This scan involves the same number of laps as for the first side of island 58.

Once the scan behind island 58 is finished, the robot 50 follows the boundary 55' markers until it reaches the point, where it began the scan behind island 58, at which point, it continues normal scanning between boundary 55 and 55' markers.

Alternatively, the scan behind island 58 can be performed without counting laps. Instead, the scan continues until island 58 has been passed. This requires noting the location of the lawn mower 50 near the boundary 55' when the lawn mower begins the scan behind island 58, so that it can be returned to that location once the scan behind island 58 is finished.

In a second method the initial location for the lawn mower is any arbitrary origin, such as point D. The lawn mower 50 is provided with location means, to determine the coordinates of the lawn mower relative to the arbitrary origin, at any specific time. The lawn mower may further be provided with direction finding means, processing means and memory means to store values generated by the said processing means and, optionally, by the said location means, as described in WO 96/38770 entitled "Navigation Method and System" assigned to the common assignees of the present application. WO 96/38770 is hereby incorporated by reference.

In this method the lawn mower is caused to move along each of the boundaries provided around (55) or within (59) the working area, to detect the said boundaries and to memorize their shape, and to store in the memory means values representative of the coordinates of the said boundaries, relative to an arbitrary origin, thereby to generate a basic map of the working area. The utility robot is then be caused to start from a starting point, such as point D, having known coordinates within the basic map of the working area, and moving arbitrarily to cover the work area 54. The coordinates of the utility robot are continuously determined by analyzing data obtained from the location means and by detecting the vicinity of a boundary; and the actual position of the utility robot on the basic map is corrected by comparing the calculated and the actual coordinates of each detected boundary.

After lawn mower 50 has mowed the lawn in the autonomous mode of operation, it may be navigated by control unit 30' to any area in work area 54 which was missed in the autonomous mode and Manual Mow button 36" may be pressed to manually mow the said area that was not mowed. The lawn mower is then further navigated through point E to point F in a second work area 56. Work area 56 is small enough to easily mow manually. It need not have a boundary which is detectable by the lawn mower and may be mowed by the manual mode of operation, such as described above. Thus the entire required area, including areas missed in the autonomous mode and physically separated areas, is processed by the end of the lawn mower's operation.

Figure 5:
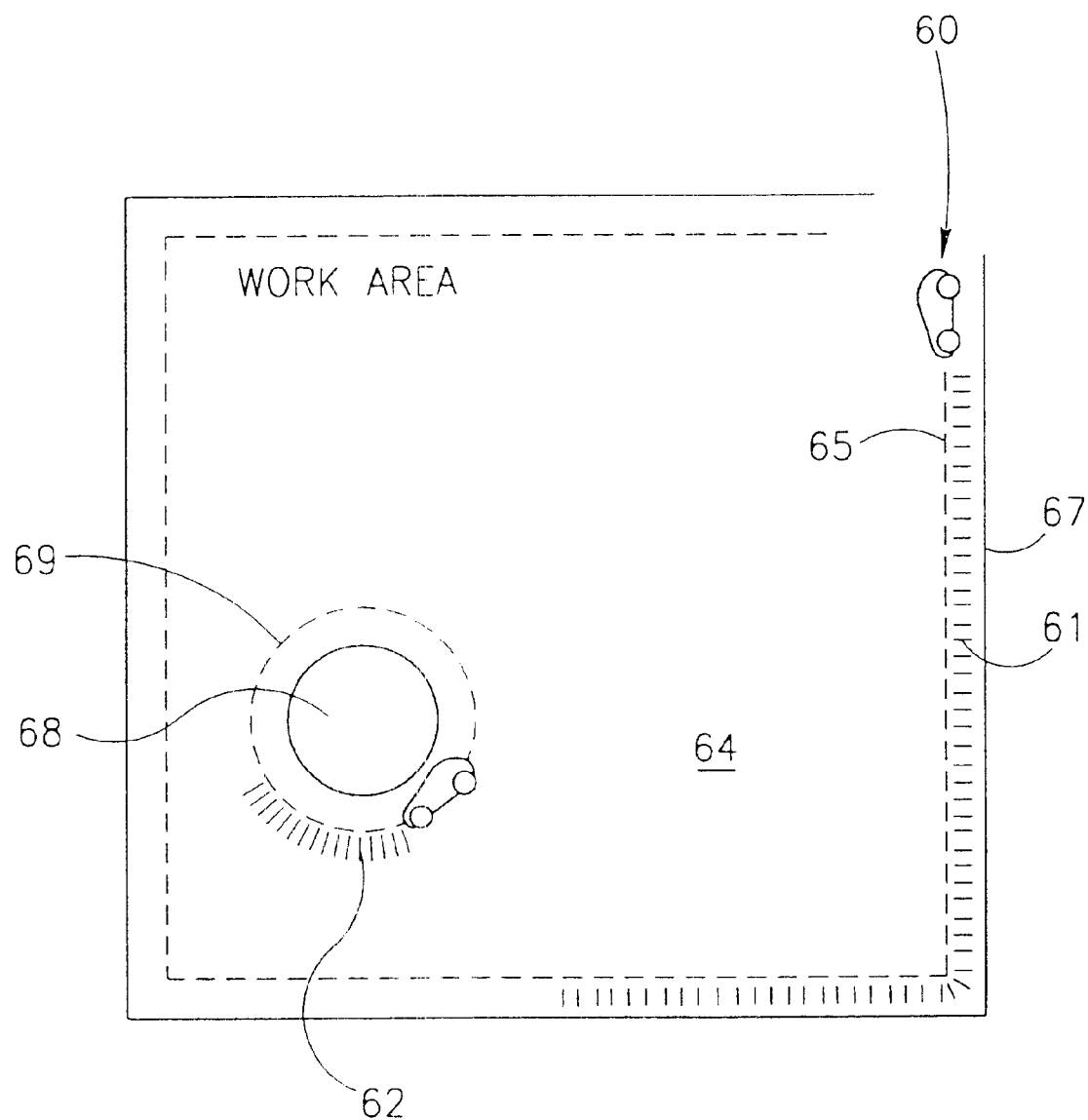
FIG. 5 is a schematic illustration of the utility robot of the invention operating as a lawn mower in an edge cutting mode, according to an embodiment of the invention.

Reference is now made to FIG. 5 which is a schematic illustration of a task being performed by the lawn mower in the edge cutting mode.

Edge cutting may be performed either by manually walking the lawn mower generally referenced 60 along the edges 61 and pressing Manual Mow button 36' (see FIG. 2B) or by having the lawn mower perform in the edge cutting mode. The Edge cutting mode is accessible through control panel 30 (see FIG. 2A). The edge cutting mode may be started by pressing EDGE button 37 or by programming a function which enables the edge cutting mode to automatically start after the autonomous lawn mowing of the device is finished and which is operated by pressing GO button 35. Once the edge cutting mode is initiated the lawn mower is caused to move along the boundaries provided around (65) or within (69) the working area 64, while mowing. Parameters such as the width of the mower are taken into account in positioning boundaries 65 and 69 such that moving the lawn mower along, or on top of these boundaries will enable efficient cutting of work area 64, or obstacle 68, edges 61 and 62.

It will be appreciated by persons skilled in the art that the present invention is not limited by what has been particularly shown and described herein above. Rather the scope of the invention is defined by the claims which follow:

What is claimed is:

1. A utility robot for operating in multiple operative modes, said utility robot comprising:
   a main body configured for receiving at least one signal from either of a manual control device or a remote control device, each of said manual and remote control devices configured for providing said at least one signal corresponding to said at least one operative mode for said robot;
   a recognition system for recognizing said at least one signal; and
   a controller in communication with said recognition system, for operating said robot in said at least one operative mode in accordance with said at least one signal from either of said manual and said remote control devices.

2. The utility robot of claim 1, wherein said main body additionally comprises a port configured for communication with either of said manual or remote control device.

3. The utility robot of claim 2, wherein said manual control device is removably attachable to said port.

4. The utility robot of claim 1, wherein said at least one operative mode is selected from the group comprising: charging, immobilizing, autonomous mode, edge cutting mode and manual mode.

5. The utility robot of claim 1, wherein said utility robot is selected from the group comprising: lawn mowers, vacuum cleaners, wet floor cleaners and snow removers.

* * * * *